United States Patent [19]

Mammino et al.

[11] 4,066,563
[45] Jan. 3, 1978

[54] COPPER-TETRA-4-(OCTADECYLSUL-FONOMIDO) PHTHALOCYANINE ELECTROPHOTOGRAPHIC CARRIER

[75] Inventors: Joseph Mammino, Penfield; Franklin Jossel, Rochester, both of N.Y.

[73] Assignee: Xerox Corporation, Stamford, Conn.

[21] Appl. No.: 617,772

[22] Filed: Sept. 29, 1975

[51] Int. Cl.² ............................................. G03G 13/08
[52] U.S. Cl. ............................... 252/62.1 P; 96/15 D
[58] Field of Search ................ 96/1.2, 15 D; 252/62.1

[56] References Cited

U.S. PATENT DOCUMENTS

| | | | |
|---|---|---|---|
| 3,533,835 | 10/1970 | Hagenbach et al. | 252/62.1 X |
| 3,551,337 | 12/1970 | Robinson | 96/1.2 X |
| 3,775,103 | 11/1973 | Sadamatsu et al. | 252/62.1 X |
| 3,804,619 | 4/1974 | Mammino et al. | 96/1.2 |
| 3,900,587 | 8/1975 | Lenhard et al. | 252/62.1 X |

*Primary Examiner*—David Klein
*Assistant Examiner*—John L. Goodrow
*Attorney, Agent, or Firm*—James J. Ralabate; Harvey M. Brownrout; Paul A. Leipold

[57] ABSTRACT

A color electrophotographic process is provided which employs magenta, cyan and yellow toners, each in combination with a carrier coated with a resin containing copper tetra-4-(octadecylsulfonomido) phthalocyanine. Thus, for the first time a developer package is provided which is capable of producing prints of sharp quality employing a common carrier. The various magenta, cyan and yellow toners employed in connection with the newly provided coated carrier are also disclosed.

5 Claims, 3 Drawing Figures

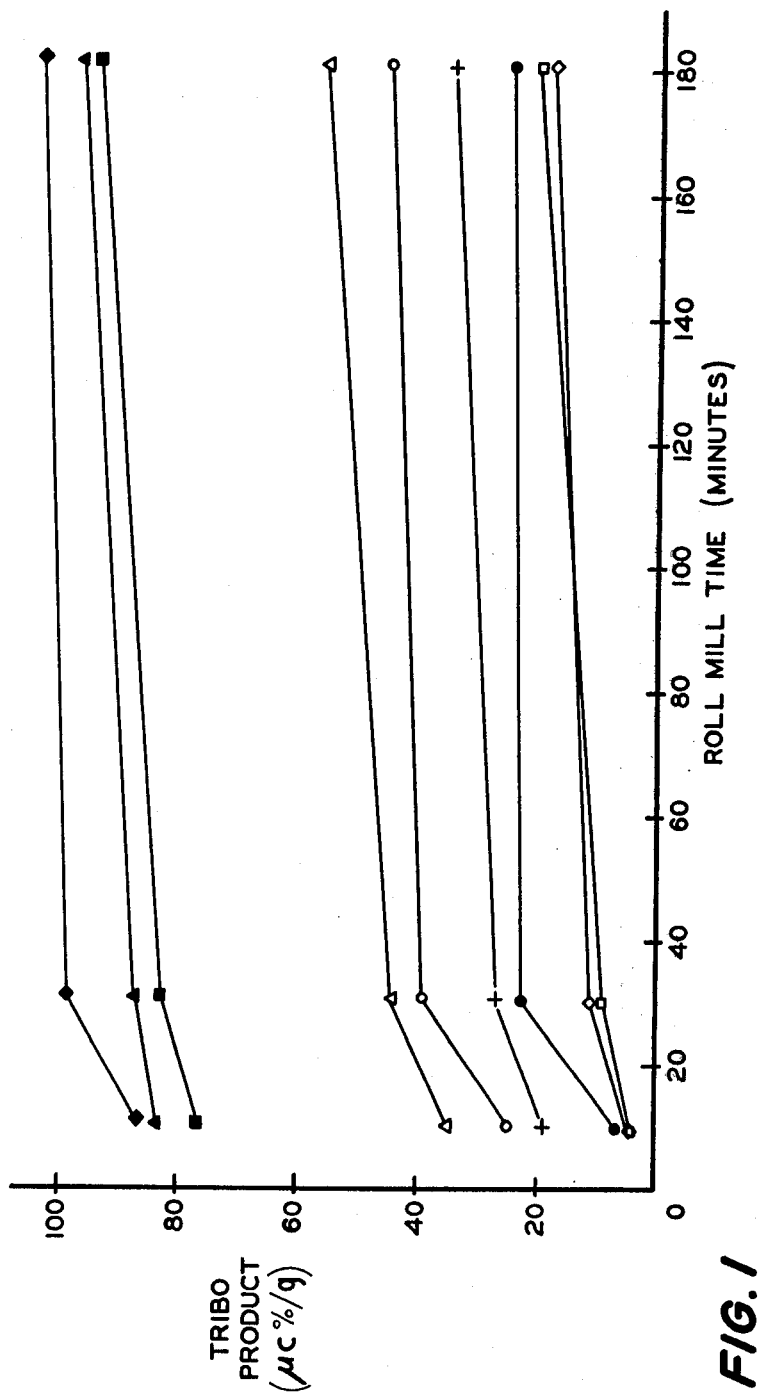

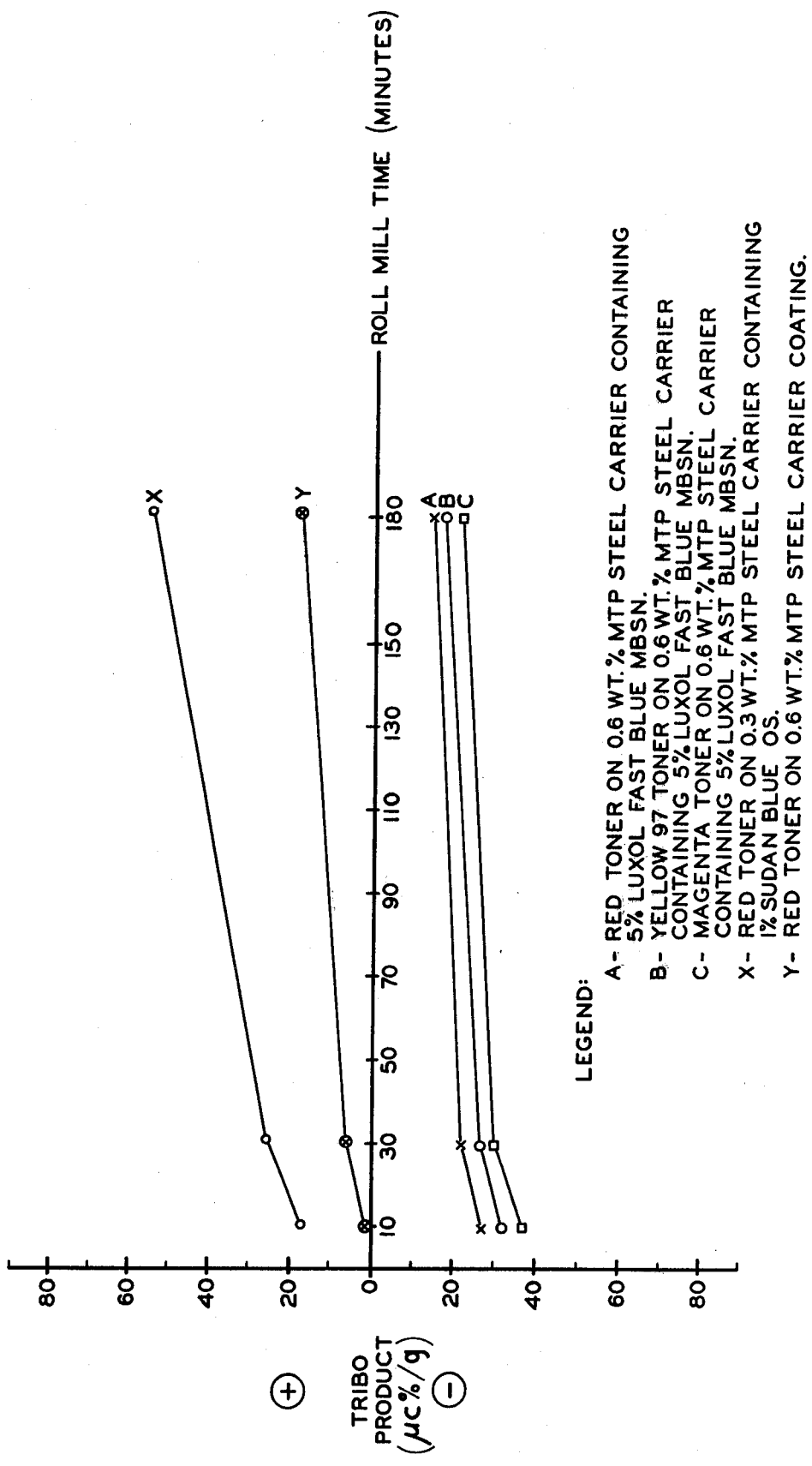

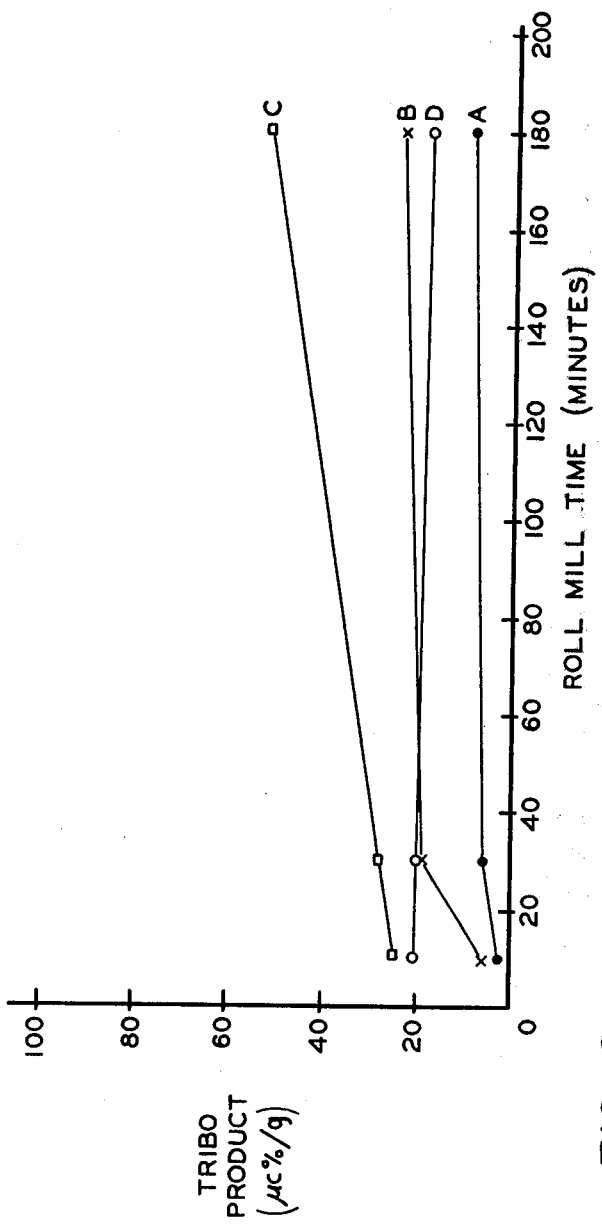

COPPER-TETRA-4-(OCTADECYLSULFONOMIDO) PHTHALOCYANINE ELECTROPHOTOGRAPHIC CARRIER

BACKGROUND OF THE INVENTION

This invention relates to color electrophotography and more specifically concerns specific developers employed in a color electrophotographic process.

Color electrophotography with multiple development techniques is capable of producing color reproductions employing multiple sequencing of electrophotographic charging, exposing, and developing steps with color toners. A suitable photoconductor such as substantially panchromatic zinc oxide photoconductive paper, electrofax paper, for example, is electrostatically charged uniformly in the dark then exposed through a green filter to an imagewise projection of a color image to form an electrostatic latent image on the photoconductor. The electrostatic latent image is then developed with the complementary magenta colored toner to form a magenta-colored image corresponding to said electrostatic latent image and transferred in register to an image receiving member. A zinc oxide photoconductive paper is then again electrostatically charged uniformly in the dark and then exposed through a red filter to an imagewise projection of a color image in register with said magenta developed image to form a second electrostatic latent image which second image is developed with the complementary cyan-colored toner and likewise transferred in register. Similarly, zinc oxide photoconductive paper is again electrostatically uniformly charged in the dark and then exposed through a blue filter to an imagewise projection of a color imaged in register with said magenta and cyan-developed images to form a third electrostatic latent image which is then developed with the complementary yellow toner and again transferred in register.

This conventional electrophotographic process with superimposed development to obtain images of cyan, magenta, and yellow, respectively, is capable of producing multicolor images by employing toners of different colors. The sequence of exposures through color filters in this multiple development process may be performed in any suitable sequence other than the green, red, and blue sequence recited above. In any event, after the desired number of exposures and developments and transfers in register, the finished image is itself fused to provide a permanent reproduction of the original.

In conventional electrophotographic imaging processes commonly referred to as xerographic imaging processes or xerography, there are numerous known carrier materials from which to select in providing a developer, i.e. a toner and a carrier combination. However, in color electrophotographic imaging the selection of appropriate carrier material is not just a matter of choice. For example, steel shot may be employed with the cyan and yellow toner materials, but steel shot is found to be unsatisfactory with the magenta toner therefore necessitating the discovery of an appropriate carrier, such as nickel berry, to perform this function. Further, the selection of a toner material of the appropriate color and triboelectric properties is in itself far more than a matter of choice. A colorant and resin combination must be selected such that the color, of course, is the appropriate hue, but more significantly that the toner possesses the appropriate triboelectric properties which will enable it to function in an electrophotographic automatic imaging mode. Few of these toner materials are known. It, therefore, becomes even a more demanding and crucial operation to develop the appropriate combination of toner and carrier so that they will develop and maintain the appropriate triboelectric relationship, this is further complicated by employing these color developers in combination in an electrophotographic imaging process.

Each developer employed comprises ordinarily a toner or a resin colorant mixture in combination with a carrier. It is a function of the toner carrier combination or developer package in a given development system, for example cascade, to assume a triboelectric relationship such that the toner will be carried with the carrier during the development cycle by electrostatic attraction and then selectively deposited chargewise on the electrostatic latent image which has a greater affinity for the toner electrostatically than does the carrier particle. In addition to the very significant triboelectric properties that a developer must possess and maintain during the development cycle, the toner must possess the appropriate color and continue to function under machine conditions which expose the developer to impaction and humidity among other undesirable factors. It is, therefore, critical that a specific toner which comprises a colorant and a resin be combined with a specific carrier of the appropriate size relation to the toner particle so that the appropriate color is exhibited and the appropriate triboelectric relationship is maintained to achieve successful development. Under continuous electrophotographic imaging, it has been found that with regard to one developer package great difficulty is realized in maintaining the proper triboelectric relationship so that proper development is achieved. With the advent of a three-color system, the complexities of producing suitable cyan, magenta, and yellow developers which will cooperate in a color electrophotographic continuous imaging process, as above described, are further exaggerated. It is apparent that any one of a number of variables in any one of the developers could cause incomplete, improper, or inadequate developments so that the color balance is thereby shifted resulting in a completely unacceptable color print.

It is therefore, an object of this invention to provide an electrophotographic color system devoid of the above noted deficiencies.

It is a further object of this invention to provide unique developer materials which surprisingly produce sharp true reproductions in the color electrophotographic imaging process.

Yet another object of this invention is to provide a novel color electrophotographic imaging process.

Yet again another object of this invention is to provide a trichromatic electrophotographic imaging process of the registration type.

These and other objects of the instant invention are accomplished generally speaking by providing color developers of a toner and a carrier with a coating for the carrier comprising a copper tetra-4-(octadecylsulfonomido) phthalocyanine. A carrier coating comprising copper tetra-4-(octadecylsulfonomido) phthalocyanine pigment is employed as the carrier coating in connection with the formation of a developer for all of the cyan toner, magenta toner, and yellow toner normally employed in a trichromatic registration color-type xerographic process.

The criticality of pairing unique toners with distinctive carrier systems in order to provide commercially acceptable electrophotographic developer systems in order to produce a full color system is more fully described in U.S. Pat. No. 3,804,619 and in U.S. Pat. No. 3,909,259 which are hereby incorporated by reference. Thus, it is seen that conventionally employed methyl terpolymer coated steel carriers which are excellent for use with many toner systems including some yellow toner systems, cyan-colored systems, but not magenta toner systems, do not find uniform application in color imaging systems. Therefore, both methyl terpolymer coated steel carriers and uncoated nickel berry carriers of necessity had to be employed in the developer packages employed in a trichromatic electrophotographic imaging system.

The nickel berry carrier is a member of the group of nodular carriers disclosed in U.S. Pat. Nos. 3,847,604 and 3,767,568 characterized by a pebbled surface with recurring recesses and protrusions giving the particle a relatively large surface area and composed of nickel. When employing the phthalocyanine coated carrier of the instant invention, one carrier may be employed for the cyan toner, and the yellow toner system with a substantially increased life cycle; and surprisingly with a magenta toner such as 2,9-dimethylquinacridone pigment which formerly could only be employed in connection with an uncoated nickel berry carrier. Thus, the three developers as employed in a color electrophotographic automatic imaging mode have been substantially improved and simplified by virtue of the fact that a common carrier may be used with each toner system to provide excellent imaging quality.

The above mentioned developers perform surprisingly well in combination yielding color-xerographic prints of originals in an automatic mode which are clear and true. When employed in an electrophotographic imaging mode, these developers, or the developer package as it is termed, proves to have a highly acceptable performance life in an automatic electrophotographic imaging apparatus. There is no degradation of the triboelectric properties of the developers nor unacceptable imaging due to impaction and other problems associated with prior art developers.

The ability to use only one carrier in the three developers needed in a commercial sequential imaging color copier is a great advantage. It eliminates the necessity of stocking and distributing two or three types of carriers, eliminates service errors in the wrong combination of toners and carriers, and minimizes problems of carry over of developer from one color to another within the copier. The use of one carrier further makes the exhaustion of the developer and its replacement more uniform for each color used in the machine. Thus, this invention is a useful and surprising advance in color copying.

The carriers employed with the cyan, yellow, and magenta toners is formed by coating a copper-tetra-4-(octadecylsulfonomido) phthalocyanine containing resin on steel shot. The steel shot carrier is about 100 microns in diameter as compared to the cyan, magenta and yellow toner particle sizes which are about 16 microns. The phthalocyanine is applied uniformly by conventional techniques to a suitable concentration of from 0.25 weight percent to 5 weight percent based on the carrier polymer coating. A concentration of 0.25 to 1 weight percent has been found to be optimum as it gives good triboelectric properties and long life.

The developer package thus provided is usually disposed in three separate developer housings in an automatic color electrophotographic imaging machine. A photoconductive member is then charged, selectively exposed to the light of one of the primary colors and then developed with the developer, i.e. the complement to that primary color. The image thus formed is then transferred to an image receiving member. In two successive operations the process is again repeated to provide images employing the other two primary colors, developing in each case with the complement of the respective primary colors, and then transferring both images in registration to the image receiving member after which the final image is fixed normally by fusing.

The cyan, yellow, and magenta colorants may be combined with any suitable electrophotographic resin. The selected colorant may be combined with any typical resin including: thermoplastics including olefin polymers such as polyethylene and polypropylene; polymers derived from dienes such as polybutadiene, polyisobutylene, and polychloroprene; vinyl and vinylidene polymers such as polystyrene, styrene butyl-methacrylate copolymers, styrene-acrylonitrile copolymers, acrylonitrilebutadienestyrene terpolymers, polymethylmethacrylate, polyacrylates, polyvinyl alcohol, polyvinylchloride polyvinylcarbazole, polyvinylethers, and polyvinyl ketones, fluorocarbon polymers such as polytetrafluoroethylene and polyvinylidene fluoride; heterochain thermoplastics such as polyamides, polyester, polyurethanes, polypeptides, casein, polyglycols, polysulfides, and polycarbonates; and cellulosic copolymers such as regenerated cellulose, cellulose acetate and cellulose nitrate. The preferred toner resin for use in the instant invention is styrene-n-butyl-methacrylate in a ratio of 65 weight percent sytrene to 35 weight. This resin in combination with each of the colorants gives particularly desirable triboelectric and fusing properties.

Any suitable inorganic or organic photoconductor may be used in the process of the present invention. Typical inorganic photoconductor materials are: sulfur, selenium, zinc sulfide, zinc oxide, zinc cadmium sulfide, zinc magnesium oxide, cadmium selenide, zinc silicate, calcium-strontium sulfide, cadmium sulfide, indium trisulfide, gallium triselenide, arsenic disulfide, arsenic trisulfide, arsenic triselenide, antimony trisulfide, cadmium sulfo-selenide and mixtures thereof. Typical organic photoconductors are: triphenylamine; 2,4-bis(4,4'-diethylaminophenyl)-1,3,4-oxadiazol, N-isopropylcarbazole, triphenylpyrrol; 4,5-diphenyl-imidazolidinone; 4,5-diphenylimidazolidinethione; 4,5-bis-(4'-aminophenyl)-imidazolidinone; 1,5-dicyanonaphthalene, 1,4-dicyanophthalene; aminophthalodinitrile; nitrophthalodinitrile; 1,2,5,6-tetraaza-N-isoproplycarbazole triphenylpyrrol; 4,5-diphenylimidazolidinone; 4,5-diphenylimidazolidinethione; 4,5-bis-(4'-amino-phenyl)-imidazolidone; 1,5-dicyanonaphthalene; 1,4-dicyanonaphthalene; aminophthalocinitrile; nitrophthalodinitrile; 1,2,5,6-tetra-azacyclooctatetraene-(2,4,6,8); 2-mercaptobenzthiazole; 2-phenyl-4-diphenylidene-oxazolone; 6-hydroxyl-2,3-di(p-methoxy-phenyl)-benzofurane; 4-dimethyl-amino benzylidene; benzhydrazide; 3-benzylidene)-p-bromo-aniline; 2,3-diphenyl quinazoline; 1,2,4-triazine; 1,5-diphenyl-3-methyl-pyrazoline; 2-(4'-dimethyl-aminophenyl) 'benzoxazole; 3-amino-carbazole; phthalocyanines; trinitrofluoronone-polyvinylcarbazole charge transfer complexes and mixtures thereof.

Any suitable colorants may be used in the toners for the sequential imaging process of the invention which are compatible so as to yield sharp, high-quality color images. Cyan colorants for toners found to be suitable for the process include tetra-4-(octadecylsulfonomido) phthalocyanine, copper phthalocyanine pigment Colour Index No. 74160 Pigment Blue 15 and indanthrene blue Colour Index No. 69810 Special Blue X-2137. Magenta colorants for toner suitable for the invention include 2,9-dimethylquinacridone pigment Colour Index Pigment Red 122, diazo dye Colour Index No. 26050 Solvent Red 19 and anthraquinone dye Colour Index No. 60710 Disperse Red 15. Yellow colorants suitable for toner for the invention include 3,3-dichlorobenzidene acetoacetanilide, monoazo dye Colour Index No. 12700 Solvent Yellow 16, Foron Yellow SE-GLF Colour Index Disperse Yellow 33, azo dye C.I. 21230 Colour Index Solvent Yellow 29 and azo dye Colour Index Yellow pigment 97. Colour Index Yellow pigment 97, referred to as Yellow 97, is formed by a method generally described in U.S. Pat. No. 2,644,814 and satisfies the formula:

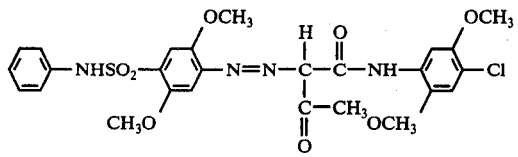

A preferred combination is copper tetra-4-(octadecylsulfonomido) phthalocyanine pigment cyan toner, 2,9-dimethylquinacrydone pigment Colour Index Pigment Red 122 magenta toner and pigment Yellow 97 yellow toner which result in long life and sharp images when used in a sequential imaging process. As set forth above, the preferred resin for use in formation of the toner is a styrene-n-butylmethacrylate copolymer in a 65/35 weight relationship of styrene to butylmethacrylate.

Any suitable method of charging may be employed in the system of the instant invention. Typical charging methods include corona, charge deposition resulting from air breakdown in the gap commonly referred to as TESI or charging in vacuo with an electron gun.

Any suitable method of exposure may be employed in the system of the instant invention. Typical methods of exposure include: reflex, contact, holographic techniques, non-lens slit scanning systems, and optical projection systems involving lens imaging of opaque-reflection subjects as well as transparent film originals.

Any suitable method of fixing may be employed in the process of the instant invention. Typical methods of fixing include: heat-pressure fusing, radiant fusing, combination radiant, conductive and convection fusing, cold pressure fixing, flash fusing, solvent fusing, and combination heat, pressure solvent fusing. Radiant fusing is a preferred method of fusing images of several toner layers thickness as formed by sequential imaging processes.

The developer compositions of the present invention may be prepared by any well-known developer mixing combination technique. Generally speaking, satisfactory results are obtained when about one part toner is used with about 10 to 200 parts by weight of carrier. Toner is generally prepared by blending and milling the components and thereafter micropulverizing the resulting mixture. Alternatively, the toner particles may be formed by spray drying, suspension polymerization, hot melt atomizing, or precipitation of a solution of the toner composition. The colored toner particles of the invention are preferably formed by extrusion of the color polymer followed by breaking down of the extrudate into toner size particles. When the toner mixture of this invention is employed in the cascade development process, the toner should have an average particle diameter of less than about 30 microns and preferably between about 5 and about 20 microns for optimum results. For use in powder cloud development methods, particle diameters of slightly less than about 5 microns are preferred.

Any suitable resin may be selected to be combined with copper-tetra-4-(octadecylsulfonomido) phthalocyanine of the invention to form the coated carrier of the invention. Typical of such coatings are novalac type phenolics, styrenemaleic anhydrides, polymeric organo silicones and those disclosed in U.S. Pat. No. 3,526,533. The preferred coating resin for the process of the invention is the methyl terpolymer coating disclosed in Example XIII of the above-referenced patent. This is a polymer of styrene 15 parts by weight, methylmethacrylate 85 parts by weight and vinyltriethoxysilane 5 parts by weight which gives desirable hardness, triboelectric properties and long life in the process of the invention.

To further define the specifics of the present invention, the following examples are intended to illustrate and not limit the particulars of the present system. Parts and percentages are by weight unless otherwise indicated.

EXAMPLE I

Cyan, magenta, and yellow toners are prepared which are respectively designated as copper tetra-4-(octadecylsulfonomido) phthalocyanine pigment available from GAF Corporation under the designation of Sudan Blue OS, a 2,9-dimethylquinacridone pigment identified in the Colour Index as Pigment Red 122 available from American Hoechst Corporation under the designation Hostaperm Pink E, and 3,3-dichlorobenzidine acetoacetanilide pigment identified in the Colour Index as Pigment Yellow 12 available from Hercules, Inc., under the designation Amazon Yellow X-2485. Each colorant is dispersed in a 65/35 styrene to n-butylmethacrylate copolymer. Five parts of each colorant are placed in 95 parts of beads of the toner copolymer resin together to form a homogenous mixture. The pigments employed have a particle size essentially less than one micron with occasional agglomerates up to about five microns. The toner copolymeric resin beads that are employed are about 1/16 inch in diameter. The mixture is then fed into a twin-screw extruder operating at a temperature of about 150° C. The extruder softens the copolymer resin, disperses the pigment throughout the molten resin, and extrudes the mixture as a strand of about ⅛ inch in diameter. The strand is cooled by immersion in a cold water bath and cut to about 1/74 inch length pellets. The pellets are continuously ground in a controlled pressurized air-jet mill to yield toner particles of about 16 microns in size. The cyan, yellow, and magenta toners produced as above are combined with steel carrier particles coated with resin containing copper tetra-4-(octadecylsulfonomido) phthalocyanine. The steel carrier has a particle diameter of about 100 microns. The cyan toner is blended with a steel carrier of 0.6 weight percent of a terpolymer material prepared as disclosed in Example XIII of U.S. Pat. No. 3,526,533, except containing 1% of copper tetra-4-(octadecylsulfonomido) phthalocyanine based on polymer coated steel carrier to yield a developer containing about 2% toner concentration by weight. The yellow toner is blended with the same phthalocyanine coated steel carrier to yield a developer containing about 3% toner by weight. The magenta toner is blended with the same phthalocyanine coated carrier to yield a developer containing about 4% toner concentration by weight. The steel carrier employed is magnetic. The developers thus produced are disposed in magnetic brush developer housings which are positioned around a selenium photoconductor. The photoreceptor is charged to a positive potential of +1000 volts and exposed to a color image through a blue filter. The latent electrostatic charge remaining on the photoreceptor is developed with the yellow developer by engaging the developer housing into development configuration with the photoreceptor. The image on the photoreceptor is transferred to a receiver sheet in register. The photoreceptor is cleaned of the residual yellow toner and the cycle above is repeated by exposing through a green filter and developing the resulting electrostatic latent image with a magenta developer. This image is then transferred in register to the same receiver sheet containing the yellow separation image. The process is repeated a third time except that the red filter is used for exposure and the image developed with the cyan developer. The resulting image is transferred in register to a receiver sheet containing both the yellow and magenta toner images. The receiver sheet containing the cyan, magenta, and yellow toner separation images in register is then heat fused to adhesively fix and fuse the images to the substrate. The above process is repeated for 75,000 cycles thereby producing 25,000 color prints of good contrast, color and quality.

EXAMPLE II

The procedure as outlined in Example I is again performed with the exception that the cyan, magenta, and yellow toners are prepared which are respectively designated as copper phthalocyanine pigment identified in the Colour Index as C.I. 74160, C.I. Pigment Blue 15; anthraquinone dye identified in the Colour Index as C.I. 60710, C.I. Disperse Red 15; and monoazo dye identified in the Colour Index as C.I. 12700, C.I. Solvent Yellow 16. A result similar to that in Example I is obtained.

EXAMPLE III

The procedure as outlined in Example I is again performed with the exception that the cyan, magenta, and yellow toners are prepared which are respectively designated as indanthrene blue identified in the Colour Index as CI69810, Special Blue X-2137; disazo dye identified in the Colour Index as CI26050, CI Solvent Red 19; and nitrophenylamine-sulfonamide identified in the Colour Index as Foron Yellow SE-GLF, CI Disperse Yellow 33. The process is repeated for 25,000 cycles thereby producing prints of good contrast, color and quality.

EXAMPLE IV

A magenta 2,9-dimethylquinacridone toner is combined with a .6 wt. % methyl terpolymer coated 100 micron steel carrier to provide a developer. The developer is evaluated in a conventionally employed color electrophotographic imaging apparatus, a Xerox 6500 machine. Developer failure is attributed to a continuous loss of developer tribo properties accompanied by high print background toner deposits. The machine tribo results of the developer are as follows:

| Print Level | T.C. % | Tribo* µc/gm | Tribo Product** µc %/gm | Image Density |
|---|---|---|---|---|
| Initial | 4.8 | 3.3 | 15.8 | 1.0 |
| 1K | 6.2 | 2.4 | 14.9 | 0.85 |
| 2K | 5.9 | 1.8 | 10.6 | 0.85 |
| 3K | 3.4 | 1.7 | 5.8 | 0.90 |
| 4K | 2.6 | 1.7 | 4.4 | 0.90 |
| 5K | 2.6 | 0.8 | 2.1 | — |

*All tribo measurements were made as described in U.S. Pat. 3,533,835 and refer to the carrier.
**Tribo product is the product of toner concentration multiplied by tribo.

Then a carrier coating on a 100 micron steel carrier bead is prepared containing 0.2 wt. % methyl terpolymer containing 0.5% of Sudan Blue OS dissolved and dispersed throughout the resin matrix. The carrier is combined with the magenta toner described above to form a magenta developer which is print evaluated in a 6500 machine. Throughout the 7,000 print cycles of the test, the developer tribo properties are maintained at a high level without signs of degradation. Print density and background remain stable and were of good quality. The tribo measurements taken at 1,000 print intervals are as follows:

| Print Level | T.C. % | Tribo µc/gm | Tribo Product µc %/gm | Image Density |
|---|---|---|---|---|
| Initial | 5.8 | 13.8 | 80.1 | 1.0 – 1.1 |
| 1K | 5.8 | 13.5 | 78.3 | 1.0 – 1.1 |
| 2K | 5.7 | 14.0 | 79.8 | 1.0 – 1.1 |
| 3K | 5.4 | 14.8 | 79.9 | 1.0 – 1.1 |
| 4K | 5.5 | 13.8 | 75.6 | 1.0 – 1.1 |
| 5K | 5.6 | 14.7 | 82.3 | 1.0 – 1.1 |
| 6K | 5.9 | 13.2 | 77.9 | 1.0 – 1.1 |
| 7K | 6.0 | 13.7 | 82.2 | 1.0 – 1.1 |

EXAMPLES V–XI

A series of methyl terpolymer carrier coatings are prepared on a 100 micron steel carrier bead containing varying amounts of Sudan Blue OS (substituted copper phthalocyanine). The coating is standardized at 0.6 wt. % and the substituted copper phthalocyanine incremental additions are 0.25%, 0.5% 1%, 2%, 3%, 4% and 5%. Two controls are employed in order to evaluate the results obtained, i.e. 100% methyl terpolymer, one prepared in the laboratory by the same procedure as used to prepare this series of carrier coatings and the other typical carrier prepared for commercial use. Each carrier is combined with the yellow toner comprising 5 parts, Yellow 97 and 95 parts 65/35 styrene-n-butylmethacrylate copolymer and roll mill for 3 hours. Samples of each developer are taken after 10 minutes, 30 minutes and 3 hours and the tribo product of each is measured. The results (FIG. 1) showed that the tribo product increases substantially as the amount of Sudan Blue OS in the carrier coating increases compared to the controls. The controls also compare very favorably indicating the lab coating procedure used to prepare the samples is similar to the commercial product.

EXAMPLES XII — XIV

A carrier coating is prepared comprising 0.6 wt. % Luxol Fast Blue MBSN dye dispersed in the terpolymer material of Example I. This dye is described in Example XI of U.S. Pat. No. 3,533,835. A steel carrier coated with the above composition is used to prepare three developers each based on a different colored toner: Yellow 97 toner; magenta (2,9-dimethylquinacridone toner); and a red toner prepared as outlined in Example I containing Colour Index Solvent Red 23. Roll mill tribo measurements are made after 10 minutes, 30 minutes and 3 hours and the results (FIG. 1) indicate that the toner on the Luxol Fast Blue-MTP carrier all yield reversal type developers. The Luxol Fast Blue confers low tribo charging, opposite in charge sign to the compound of this invention. Further, it is shown that the copper phthalocyanine compounds of U.S. Pat. No. 3,533,835 are not suitable to increase developer tribo properties.

EXAMPLE XV

The red toner of Example XIV is combined with a carrier composed of 100 micron steel coated carrier with 0.3 wt. % methyl terpolymer of Example I which has 1% of Sudan Blue OS dissolved and dispersed throughout the methyl terpolymer coating. The developer is roll milled and tribo measurements taken at intervals. The results (FIG. 2) show that this carrier/developer (Curve "X") charges the toner substantially higher than the Luxol Fast Blue MTP steel based developer (Curve "A") and 100% MTP/steel (Curve "Y") each with the same toner composition.

EXAMPLE XVI

A 0.6 wt. % carrier coating on 100 micron steel is prepared in typical fashion except that this coating contains 5% copper phthalocyanine compound of this invention dissolved and dispersed throughout a vinyl toluene resin used as a carrier coating. The carrier is combined with the magenta toner of Example I to form a developer which is print evaluated in a 6500 machine, a conventional xerographic color imaging machine. Throughout the 5,000 print cycles of the tests, the developer tribo properties are maintained at a high level without signs of degradation. Print density and background remain stable and are of good quality. The tribo measurements are:

| Print Level | T.C. % | Tribo μc/gm | Tribo Product μc %/gm | Image Density |
|---|---|---|---|---|
| Initial | 5.9 | 11.6 | 68.4 | 1.0 |
| 1K | 5.6 | 12.8 | 71.7 | 1.0 |
| 2K | 6.9 | 10.8 | 74.5 | 1.0 |
| 3K | 8.3 | 9.6 | 79.7 | 1.0 |
| 4K | 9.7 | 8.4 | 81.5 | 1.0 |
| 5K | 9.2 | 9.4 | 86.5 | 1.0 |

EXAMPLE XVII

In FIG. 3, the increase in tribo product value due to the addition of the copper phthalocyanine compound to a methyl terpolymer coated steel carrier is illustrated by Curves A and B. Each carrier core is 100 micron size average and coated to 0.6 wt. %. The coating of Curve B contains 5% of Sudan Blue OS dissolved and dispersed throughout the methyl terpolymer carrier coating. The methyl terpolymer coating is prepared by the process of Example I. The toner employed in this example is Yellow 97 toner.

EXAMPLE XVIII

The developer combination of Yellow 97 yellow toner with the substituted copper phthalocyanine, 100 micron coated steel carrier of Example IX, Curve B above, is evaluated in a 6500 machine and is found to produce over 10,000 prints of good quality. The tabulated developer parameters are as follows:

| Copy Level | Image Density | Tribo μc/gm | T.C. % | Tribo Product μc %/gm | Background |
|---|---|---|---|---|---|
| Initial | .91 | 10.4 | 2.55 | 26.5 | Acceptable |
| 0.5K | .96 | 11.7 | 3.14 | 36.7 | Acceptable |
| 1.0K | .84 | 12.3 | 3.08 | 37.8 | Acceptable |
| 1.5K | .97 | 11.9 | 3.43 | 40.8 | Acceptable |
| 2.0K | .95 | 11.8 | 3.50 | 41.2 | Acceptable |
| 2.5K | 1.00 | 11.8 | 3.43 | 40.0 | Acceptable |
| 3.0K | 1.04 | 10.9 | 2.93 | 31.9 | Acceptable |
| 3.5K | 1.16 | 10.8 | 3.09 | 33.3 | Acceptable |
| 4.0K | .95 | 12.9 | 2.59 | 33.5 | Acceptable |
| 4.5K | 1.24 | 13.5 | 2.62 | 35.4 | Acceptable |
| 5.0K | .97 | 13.6 | 2.68 | 36.6 | Acceptable |
| 6.0K | .95 | 12.6 | 2.79 | 35.2 | Acceptable |
| 7.0K | .97 | 12.5 | 2.85 | 35.6 | Acceptable |
| 8.0K | .88 | 12.8 | 2.50 | 32.0 | Acceptable |
| 9.0K | .96 | 10.9 | 2.45 | 26.7 | Acceptable |
| 10.0K | .90 | 10.5 | 2.23 | 23.5 | Acceptable |

EXAMPLE XIX

FIG. 3 also illustrates the increase in tribo product value of a developer composed of a cyan toner in combination with the methyl terpolymer of Example I coated steel carrier containing copper phthalocyanine compound (Curve "C") compared to control (Curve "D"). The cyan toner is composed of 5% Sudan Blue OS and 95% styrene n-butylmethacrylate copolymeric resin by weight.

In the above examples, it is clearly seen that when the toner compositions employed in the developers of the instant invention are combined with carriers other than the phthalocyanine coated carrier for the yellow, magenta and cyan toners, unsatisfactory results are obtained.

EXAMPLE XX

The process as defined in Example I is again performed with the exception that Yellow 97 toner is employed as the yellow toner with similar results obtained.

EXAMPLE XXI

The process as defined in Example I is again employed with the exception that Yellow 29 is employed as the yellow toner with similar results obtained.

EXAMPLES XXII – XXVIII

The composition as defined in Examples V–XV are employed in the process defined in Example I with similar results obtained in Example I except that the tribo product of the Yellow 97 and Yellow 29 developer increases with increasing Sudan Blue OS concentration on the carrier as observed in Examples V–XI.

Although the present examples were specific in terms of conditions and materials used, any of the above listed typical materials may be substituted when suitable in the above examples with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. A carrier for electrophotographic development comprising a core particle surrounded by an outer layer comprising resin and copper tetra-4-(octadecylsulfonomido) phthalocyanine.

2. The carrier of claim 1 wherein said core is steel.

3. The carrier of claim 1 wherein said resin is selected from the group consisting of styrene-maleic anhydrides, novalac type phenolics and polymeric organo silicones.

4. The carrier of claim 1 wherein said resin is a polymer comprising styrene, methyl methacrylate and vinyltriethoxysilane.

5. The carrier of claim 1 wherein said phthalocyanine is present in about 0.25 to about 5 weight percent of said carrier coating.

* * * * *